April 8, M. C. THOMPSON, JR., ET AL 3,437,821
RADIO-OPTICAL REFRACTOMETER FOR MEASURING INTEGRATED
WATER VAPOR REFRACTIVITY
Filed Nov. 8, 1966

INVENTORS
Moody C. Thompson, Jr.
Lockett E. Wood

BY
Alvin J. Englert
AGENT

United States Patent Office 3,437,821
Patented Apr. 8, 1969

3,437,821
RADIO-OPTICAL REFRACTOMETER FOR MEASURING INTEGRATED WATER VAPOR REFRACTIVITY
Moody C. Thompson, Jr., and Lockett E. Wood, Boulder, Colo., assignors to the United States of America as represented by the Secretary of Commerce
Filed Nov. 8, 1966, Ser. No. 593,240
Int. Cl. G01n 21/26
U.S. Cl. 250—218          5 Claims

ABSTRACT OF THE DISCLOSURE

A refractometer which transmits simultaneously a radio signal and an optical signal over a related propagation path. At the far end of the path, these signals are received, and the difference in their times of arrival is measured. This time difference is used to determine the integrated water vapor refractivity of the path.

---

Figure 1:
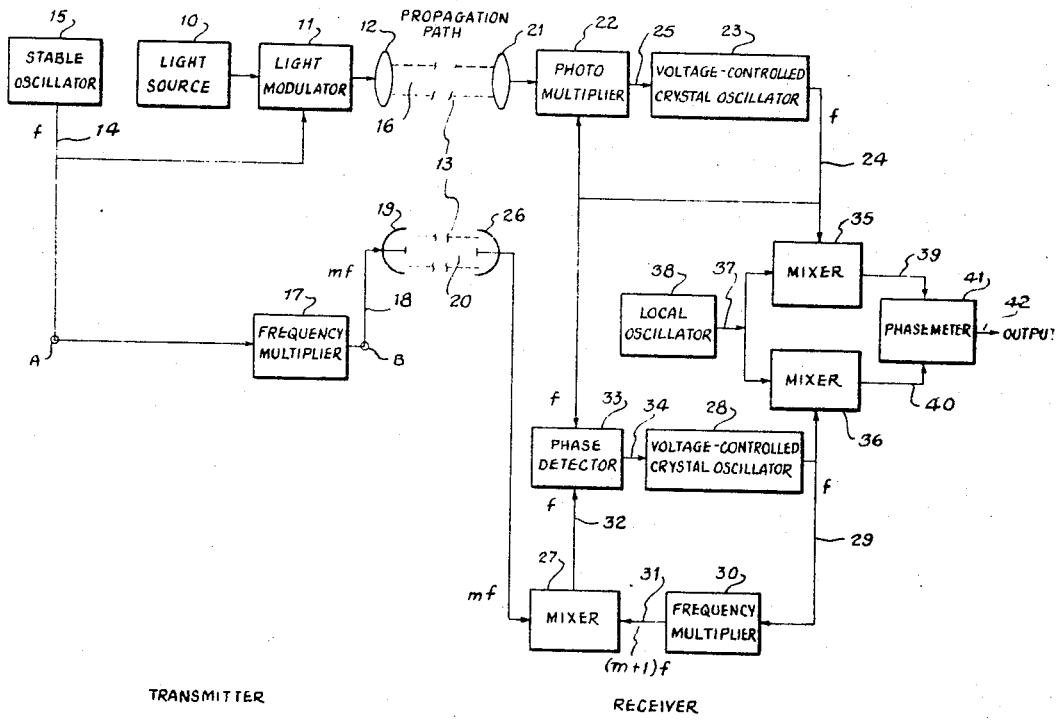

This invention relates to refractometers, and more particularly to a refractometer which utilizes radio and optical signals to measure integrated water vapor refractivity.

In radio tracking systems, radio meteorology, and the like, it often is desirable to obtain a value for the average or integrated radio refractive index of a selected radio propagation path. Heretofore this has typically been accomplished by measuring the temperature, barometric pressure and humidity at selected points along the path, entering the data into the well-known equation relating refractive index to these variables, and averaging the results. This process is both laborious and inaccurate. As is well known, the major source of error is due to the usually highly-irregular distribution of water vapor along the propagation path, and the difficulty in measuring humidity to high precision.

In view of the foregoing, it has long been recognized that an instrument capable of directly measuring the average or integrated contribution of the water vapor to the refractive index of a selected radio propagation path would be highly desirable. In accordance with the principles of the present invention, there is provided such an instrument. The instrument of the present invention directly measures and displays the value of the integral water vapor refractive of the selected path. The measurement includes the whole path, and is displayed in real time. In addition, the instrument employs a small number of commercially-available components, and is easily set up and maintained. The output thereof also lends itself to recording, when such is desirable.

In brief, a refractometer constructed in accordance with this invention transmits simultaneously a radio signal and an optical signal over the selected propagation path. At the far end of the path, these signals are received, and the difference in their times of arrival is measured. This time difference is used to determine the integrated water vapor refractivity of the path.

Figure 2:
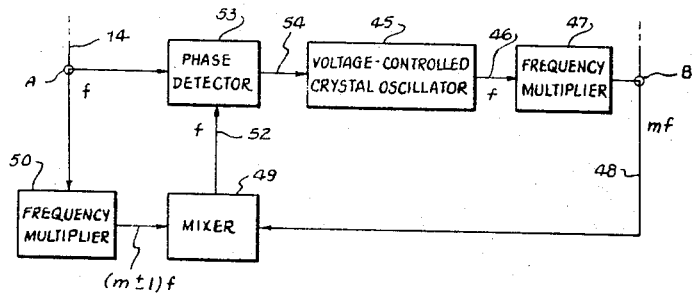

The invention will be described in further detail in connection with the drawing, in which:

FIG. 1 is a schematic diagram of a refractometer embodying the principles of this invention, and FIG. 2 is a schematic diagram of an alternative arrangement of the circuit portion between points A and B in FIG. 1.

In FIG. 1, a light source 10, light modulator 11, and projection lens 12 are aligned on an optical axis that coincides with a selected radio propagation path 13. The light modulator 11 is driven by the sine wave output 14 of a stable oscillator 15, whereby the intensity of the light 16 projected by the lens 12 varies at the frequency $f$ of the oscillator 15. The frequency $f$ preferably is as high as permitted by the light modulator 11.

The output 14 of the oscillator 15 is also frequency multiplied an integral number $m$ times by a frequency multiplier 17, to provide a signal 18 of approximately the same (microwave) frequency as the signals normally propogated over the selected path 13. The frequency multiplied signal 18 is radiated over the path 13 by a conventional directive antenna 19.

The light signal 16 and radio signal 20 propagate along path 13 at speeds that are inversely proportional to the optical refractive index and the radio refractive index, respectively, of the path. In accordance with this invention, the difference in these speeds is measured, using, for example, the receiving apparatus shown in FIG. 1.

The light signal 16 is focused by a lens 21 onto a photomultiplier tube 22. A voltage-controlled (voltage-tunable) crystal oscillator 23, having a center frequency $f$, where $f$ is the frequency of the aforementioned stable oscillator 15, has the output 24 thereof applied to an electrode, e.g., the photocathode, of the photomultiplier tube 22. The output 25 of the photomultiplier tube is in turn connected to the voltage control input of the oscillator 23. Consequently, the oscillator output 24 is phase-locked to the modulation on the light signal 16.

The radio signal 20 of frequency $mf$ is collected by an antenna 26 and fed to a mixer 27. A second voltage-controlled crystal oscillator 28 with center frequency $f$ has the output 29 thereof multiplied in frequency $m+1$ times, where $m$ is the multiplication factor of the previously-described frequency multiplier 17, by a frequency multiplier 30, and the output 31 thereof is also fed to the mixer 27. The mixer output 32 therefore contains a signal of frequency $f$. A phase detector 33 measures the phase difference between this signal 32 and the output 24 of the first voltage-controlled crystal oscillator 23, and provides a voltage 34 proportional to the difference. The voltage 34 is applied to the voltage control terminal of the voltage-controlled crystal oscillator 28. Consequently, the phase difference between the outputs 24 and 29 of the voltage-controlled crystal oscillators 23 and 30 is proportional to the difference in the propagation speeds of the optical signal 16 and radio signal 20.

The signals 24 and 29 may be applied to a phase meter; however, if the frequency $f$ of the signals is very high, it may be desirable to first apply the signals to mixers 35 and 36, respectively, and heterodyne them with the output 37 of a local oscillator 38, so as to obtain signals 39 and 40 of a frequency suitable for application to a phase meter 41. The output 42 of the meter 41 may be displayed, recorded, or otherwise utilized as desired.

In the following, it will be shown that the meter output 42 is proportional to the integrated water vapor refractivity of the propagation path 13.

It is assumed that the fixed phase shifts of the various components of FIG. 1 can be lumped together and accounted for by a suitable calibration constant. Then, over the path 13, the modulation on the light signal 16 will experience a phase shift given by $$\theta_{opt} = \bar{n}_{opt} fL/c \qquad (1)$$

where L is the length of path 13, $c$ is the speed of electromagnetic waves in vacuum, and $\bar{n}_{opt}$ is the average of the optical refractive index along the path 13. Since the output 24 of the voltage-controlled oscillator 23 is phase-locked to the modulation, the phase of output 24 will be equal to $\theta_{opt}$, with respect to the stable oscillator 15 (neglecting constant phase shifts in these elements).

For the radio signal 20, the phase shift at the receiving antenna 26 will be $$\theta_{rad} = \frac{\bar{n}_{rad}L}{c} mf \quad (2)$$

expressed in terms of phase at the frequency $mf$, where $\bar{n}_{rad}$ is now the average of the radio refractive index over the path 13.

The arrangement of the radio receiving loop 27, 33, 28, 30 requires, for equilibrium, that $$[\theta_{31} - \theta_{rad}] - \theta_{opt} = \text{constant} \quad (3)$$

which we will take as zero to illustrate the principle of operation. $\theta_{31}$ is the phase shift of the output 31 of frequency multiplier 30.

Consequently, we obtain $$\theta_{31} = \theta_{rad} + \theta_{opt} \quad (4)$$

But, since signal 31 is obtained by frequency multiplication of output 29 of the voltage-controlled crystal oscillator 28, $$\theta_{31} = (m+1)\theta_{29} \quad (5)$$

and we have $$\theta_{29} = \frac{\theta_{rad} + \theta_{opt}}{m+1} \quad (6)$$

By comparing $\theta_{29}$ with $\theta_{24}$ in the phase meter 41, we obtain the difference $\Delta\theta$ (output 42) which is proportional to the desired quantity:

$$\begin{aligned}\Delta\theta &= \theta_{29} - \theta_{24} \\ &= \frac{\theta_{rad} + \theta_{opt}}{m+1} - \theta_{opt} \\ &= \frac{\bar{n}_{rad}L}{c} \cdot \frac{mf}{m+1} + \frac{\bar{n}_{opt}fL}{(m+1)c} - \frac{\bar{n}_{opt}fL}{c} \\ &= \frac{fL}{c}\left[\bar{n}_{rad}\left(\frac{m}{m+1}\right) + \frac{\bar{n}_{opt}}{m+1} - \bar{n}_{opt}\right] \\ &= \left(\frac{m}{m+1}\right)\frac{fL}{c}(\bar{n}_{rad} - \bar{n}_{opt}) \\ &= k(\bar{n}_{rad} - \bar{n}_{opt}) \quad (8)\end{aligned}$$

where:

$$k = (m/m+1)fL/c$$

If we express the refractive index in terms of the dry air refractivity $N_d$ and the water vapor refractivity $N_w$; that is, $$n = 1 + N_d \cdot 10^{-6} + N_w \cdot 10^{-6}$$

we can write $$\Delta\theta = k[(\bar{N}_{drad} + \bar{N}_{wrad}) - (\bar{N}_{dopt} + \bar{N}_{wopt})] \cdot 10^{-6} \quad (9)$$

and since the dry terms are essentially equal [for a radio (microwave) frequency of $10^{10}$ Hz. and an optical frequency of $3 \times 10^{14}$ Hz. ($\lambda = 1\mu$), $N_{drad} - N_{dopt} \approx 2$], we find $$\Delta\theta \doteq k(\bar{N}_{wrad} - \bar{N}_{wopt}) \cdot 10^{-6} \quad (10)$$

In addition, at normal atmospheric temperatures and pressures, $N_{wrad} \approx 100 \, N_{wopt}$ and we may write $$\Delta\theta \doteq k\bar{N}_{wrad} \cdot 10^{-6} \quad (11)$$

Thus the output 42 of the phase meter 41, the phase difference $\Delta\theta$, is substantially directly proportional to the integrated water vapor refractivity $\bar{N}_{wrad}$ of the path 13.

If desired, then, the meter 41 may be calibrated in water vapor or "wet" refractivity ($N_{wrad}$) units. Alternatively, the output signal 42 may be recorded on a time-driven chart, on punched paper tape or the like, or fed into a computer for processing.

To illustrate a typical embodiment of the invention and examine the sensitivity thereof, expression (11) can be differentiated $$\begin{aligned}\frac{\delta\theta}{\delta\bar{N}_{wrad}} &\doteq k \cdot 10^{-6} \\ &\doteq \left(\frac{m}{m+1}\right)\frac{fL}{c} \times 10^{-6} \quad (12)\end{aligned}$$

If we let

L = 10 km.
$c = 3 \cdot 10^5$ km./sec.
$f = 30$ mHz.
$m = 320$ the sensitivity becomes $$\frac{320}{321} \times \frac{3 \times 10^7 \times 10}{3 \times 10^5} \times 360° \times 10^{-6}$$

or about $3.6 \times 10^5 \times 10^{-6} = 0.36°$ of phase per N-unit change in wet index. Thus, to determine $\bar{N}_{wrad}$ with a precision of 1 N-unit requires that $\Delta\theta$ be measured with a precision of 0.36 electrical degree at the selected frequency of 30 mHz. Those skilled in the art will recognize that such a phase measurement can be accomplished with proper care. Accordingly, it will be seen that the apparatus of the present invention enables one to measure the integrated water vapor refractivity to 1 N-unit, which is about 1 p.p.m. (part per million) in the refractive index. This precision is substantially better than the precision obtained with the prior measurement techniques; in addition, the measurement of the present invention is made in real time, and without computations.

FIG. 2 illustrates an alternative arrangement for frequency multiplying the output 14 of the stable oscillator 15, FIG. 1; that is to say, for converting the signal 14 of frequency $f$ at point A to a microwave signal of frequency $mf$ at point B. In FIG. 2, there is provided another voltage-controlled crystal oscillator 45 of center frequency $f$. The output 46 thereof is multiplied in frequency $m$ times by a multiplier 47, to provide the desired microwave signal 48 of frequency $mf$. Now, in order to phase-lock the voltage-controlled crystal oscillator 45 to the signal 14, the signal 48 is fed to a mixer 49, and the signal 14 is frequency multiplied $m \pm 1$ times by a multiplier 50. The output 52 of the mixer 49, of frequency $f$, and the signal 14 are fed to a phase detector 53, whose output 54 is applied to the voltage control input of the voltage-controlled oscillator 45. Consequently, the output 46 of the oscillator 45 is phase-locked to signal 14 from the stable oscillator 15, and the stable oscillator 15 is completely isolated from the frequency multiplier 47. In all other respects, the microwave signal 48 is identical to the microwave signal 18 of FIG. 1, and the operation of the complete system is therefore unchanged.

Although the present invention has been described by reference to specific illustrative embodiments thereof, it is to be understood that the invention is not limited to the embodiments shown, but covers all such variations and modifications as fall within the scope and meaning of the appended claims.

What is claimed is:
1. A refractometer comprising,
   means for simultaneously transmitting a light signal in the same direction and a radio signal over substantially the same predetermined path,
   means for receiving said signals, and
   means for measuring the difference in the times of arrival of said signals.
2. A refractometer as set forth in claim 1, wherein said transmitting means comprises,
   a stable oscillator of frequency $f$,
   means for projecting a beam of light along said predetermined path,
   means for modulating said light beam with the output of said oscillator, to provide said light signal, means for frequency multiplying the output of said oscillator $m$ times, where $m$ is a positive integer, to provide said radio signal, and means for radiating said radio signal along said predetermined path.

3. A refractometer as set forth in claim 2, where said receiving means and said measuring means comprise, means for collecting said light signal,
means for detecting the modulation of said light signal,
means for generating a first signal of frequency $f$,
first locking means for locking the phase of said first signal to the phase of said detected modulation,
means for collecting said radio signal,
means for generating a second signal of frequency $f$,
means for frequency multiplying said second signal $(m+1)$ times,
means for mixing the output of said $(m+1)$ frequency multiplying means with said radio signal,
means for detecting the phase difference between said first signal and the output of said mixing means,
second locking means for locking the phase of said second signal to the output of said phase difference detecting means, and
means for measuring the phase difference between said first and second signals.

4. A refractometer as set forth in claim 3, wherein said modulation detecting means comprises a photomultiplier tube, said first signal generating means comprising a first voltage-controlled crystal oscillator, said first locking means comprising means for connecting the output of said first voltage-controlled crystal oscillator to an electrode of said photomultiplier tube and means for connecting the output of said photomultiplier tube to the voltage control input of said first voltage-controlled crystal oscillator.

5. A refractometer as set forth in claim 4, wherein said second signal generating means comprises a second voltage-controlled crystal oscillator, said second locking means comprising means for connecting the output of said phase difference detecting means to the voltage control input of said second voltage-controlled crystal oscillator.

References Cited

UNITED STATES PATENTS

| 2,665,420 | 1/1954 | Winterhalter | 88—1 X |
| 2,866,192 | 12/1958 | Johnson et al. | 88—1 X |
| 3,098,933 | 7/1963 | Darasch | 250—217 X |
| 3,123,772 | 3/1964 | Gerks | 325—67 |

WALTER STOLWEIN, *Primary Examiner.*

U.S. Cl. X.R.

325—67; 356—128